UNITED STATES PATENT OFFICE.

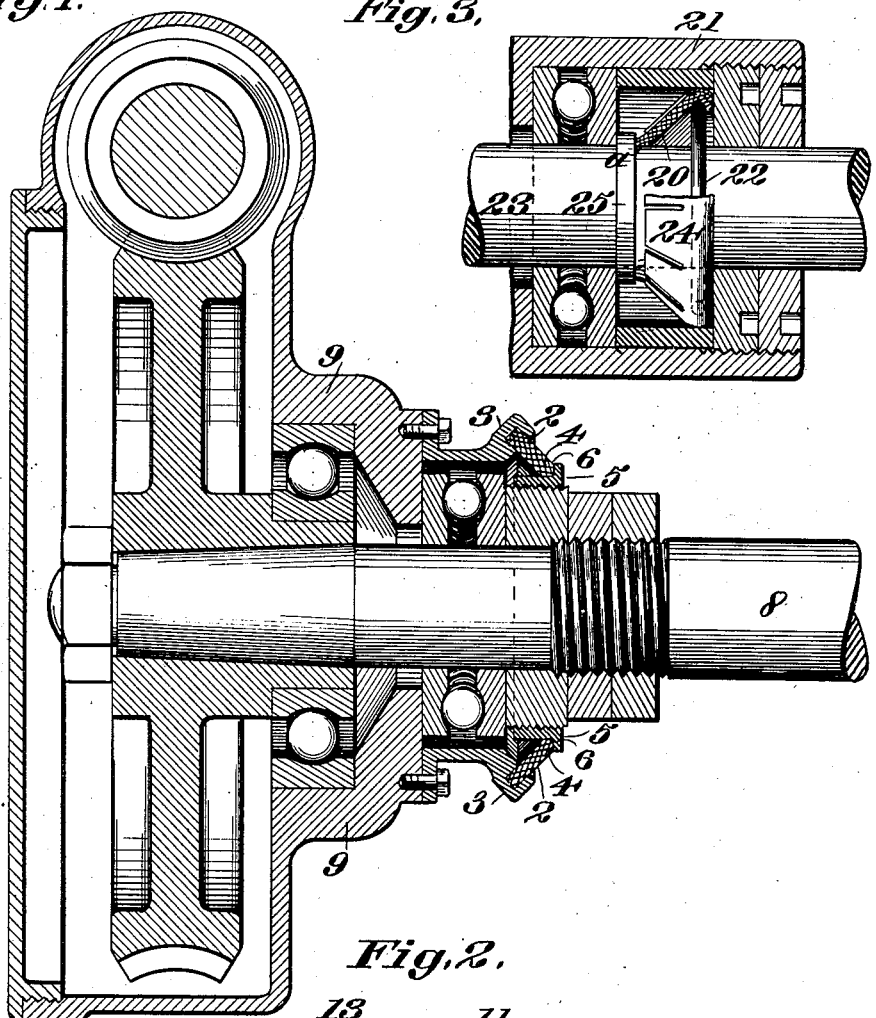
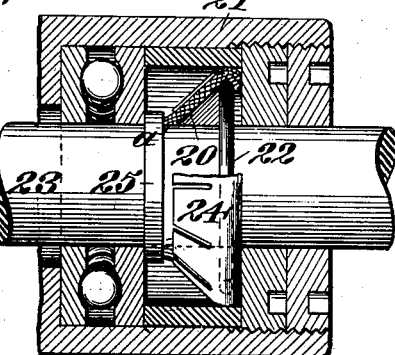
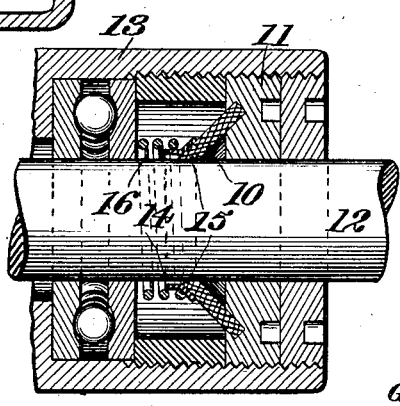

GEORGE E. MILLER, OF OAKLAND, AND EDWIN B. CANTRELL, OF SAN FRANCISCO, CALIFORNIA.

FRICTIONLESS LIQUID-PACKING.

1,057,656.  Specification of Letters Patent.  Patented Apr. 1, 1913.

Application filed November 16, 1912. Serial No. 731,752.

*To all whom it may concern:*

Be it known that we, GEORGE E. MILLER, of Oakland, in the county of Alameda, State of California, and EDWIN B. CANTRELL, of the city and county of San Francisco, State of California, citizens of the United States, have invented new and useful Improvements in Frictionless Liquid-Packing, of which the following is a specification.

This invention relates to packing, and particularly to a packing for mechanism including a casing or housing in which may be contained a fluid, liquid or lubricant, through which housing projects a moving member; the function of the packing being to prevent the escape of the liquid, fluid or lubricant within the casing or housing through the aperture about the moving member.

The object of the present invention is to provide an extremely simple, efficacious, durable packing whereby the liquid or fluid contents of a casing, housing or chamber may be prevented from escaping at such apertures in the casing, through which may project a movable member, such as a piston-rod or shaft.

The invention comprises details of construction which will be more fully explained by reference to the accompanying drawings, in which—

Figure 1 shows a form of the improved packing. Fig. 2 shows a slightly modified form of the packing. Fig. 3 shows another modification of the packing.

Considerable difficulty is experienced in obtaining an efficient, simple and relatively inexpensive packing whereby the escape of a liquid, fluid or lubricant from a chamber or housing, such for instance as a gear casing, which is adapted to contain a quantity of lubricant in which the running mechanism within the casing, as gearing, is immersed or partly immersed. This invention is provided for the purpose of preventing the escape of the liquid or lubricant around the shafts or rods which may project from the gearing case or other chamber, and, as shown in Fig. 1, consists of a dished annular member or ring 2, preferably of a substantially liquid-proof, fibrous or equivalent material, which may have inherent stiffness or be suitably stiffened by the application of an appropriate substance, such, for instance, as shellac. The ring 2 may be of such diameter as to rest at its outer, circumferential edge against a suitable seat, shoulder, or other support 3. The inner edge 4 of the ring or packing member 2 is adapted to bear upon the shaft, bushing, ring, collar or other part of the apparatus.

In Fig. 1 we have shown the edge 4 of the aperture of the packing ring 20 encompassing a device or collar 5, provided with a slightly undercut or concaved seat 6; the collar being threaded for adjustment upon a nut or other member 7 on a shaft 8. The shaft 8 projects from and is suitably supported in a housing 9, which is adapted to contain a fluid or lubricant which is to be prevented from escaping by the present packing. The screw ring 5 may be adjusted with the desired pressure against the contiguous edge 4 of the dished washer ring 2, and we have found in actual practice that this type of packing and adjusting device may be successfully used and will effectually prevent the escape of liquid when but very slight pressure is created between the packing member 2 and the part 5.

In Fig. 2 we have shown the packing member 10 as resting in a seat or support 11 and converging toward, and lightly engaging, the shaft 12 projecting from the housing 13. In this form of our invention the central portion of the annular converging washer 10 is contracted by a pressure device 14 in the nature of a washer surrounding a shaft 12 and having a flange 15 overlapping the adjacent portion of the packing member 10. The pressure device 14 is advanced against the washer 10 by a spring or equivalent device 16 which reacts against an adjacent portion of the structure.

In Fig. 3 we have shown the packing disk 20 as expanded externally against the stationary part of the housing 21 by a suitable spring or other device 22; the central portion of the packing device 20 being contracted toward the shaft or rod 23 by means of a spring, here represented as in the form of a spring washer 24, the pressure of which presses against a follower ring 25, thus contracting the central portion of the washer 20 toward the shaft or rod 23.

The packing member being, as shown, dished or formed so as to converge toward the shaft or other running part, and perforated to encompass this part, is provided with a substantially pointed apex *a* in the several views against which the follower or washer 5 of Fig. 1, 14 of Fig. 2, and 25 of Fig. 3 contacts and contracts this apex or sharp, annular edge, thereby taking all of the pressure practically and forming a seal and a running joint preventing the escape of the fluid or lubricant from the chamber or casing containing the lubricant.

A peculiarity incident to the present packing is that instead of being worn away and spaced from the rotating or movable member to be embraced, the packing automatically follows the shaft or other part in its vibrations, being constantly and automatically contracted adjacent to the shaft by the follower or pressure device provided. Ordinarily annular packing rings supported in the journals of structures to be packed are rapidly enlarged where the bearing friction occurs, so that the liquid or fluid to be packed against readily escapes. In the present invention the movable part imposes no load on the packing member and this through means of the follower is constantly and automatically contracted to make the desired oil-tight fit.

Having thus described our invention, what we claim and desire to secure by Letters Patent is—

1. Means for packing a casing adapted to contain a fluid comprising a frusto-conoidal, compressible, pliable ring supported at its base by a part of the casing and embracing at its ridge a movable part projecting from the casing, and a device for reacting upon the rim of the ring to form a liquid-tight running joint with the moving part.

2. A packing member consisting of a frusto-conoidal, pliable, compressible substantially liquid-proof ring converging toward and bearing upon a part to be packed circumferentially and adapted to yieldably follow the part when this moves laterally.

3. A packing member consisting of a conoidal, contractile, pliable ring of impervious material provided with a central perforation for the reception of a moving part, and means consisting of a follow ring adapted to bear against the rim formed at the junction of the inner edge of the ring and one of its side surfaces.

4. The combination with a casing adapted to contain a liquid, of a frusto-conoidal, contractile, diaphragmatic, pliable ring supported at its base by a part of the casing, a running member projecting from the casing and said ring, and a compression device encompassing said member and bearing against the contiguous, central rim of the packing member to form an oil-tight running joint with said member.

5. The combination with a casing adapted to contain a liquid, of a frusto-conoidal, fibrous, pliable packing ring supported at its base by a part of the casing, a running member projecting from the casing, a follower encompassing said member and bearing against the contiguous rim portion of the packing member to form an oil-tight running joint, and contracting means for holding said follower in adjustment against the inner annular edge of the packing member.

In testimony whereof we have hereunto set our hands in the presence of two subscribing witnesses.

GEORGE E. MILLER.
EDWIN B. CANTRELL.

Witnesses:
GEO. H. STRONG,
JOHN H. HERRING.